Figure 1:
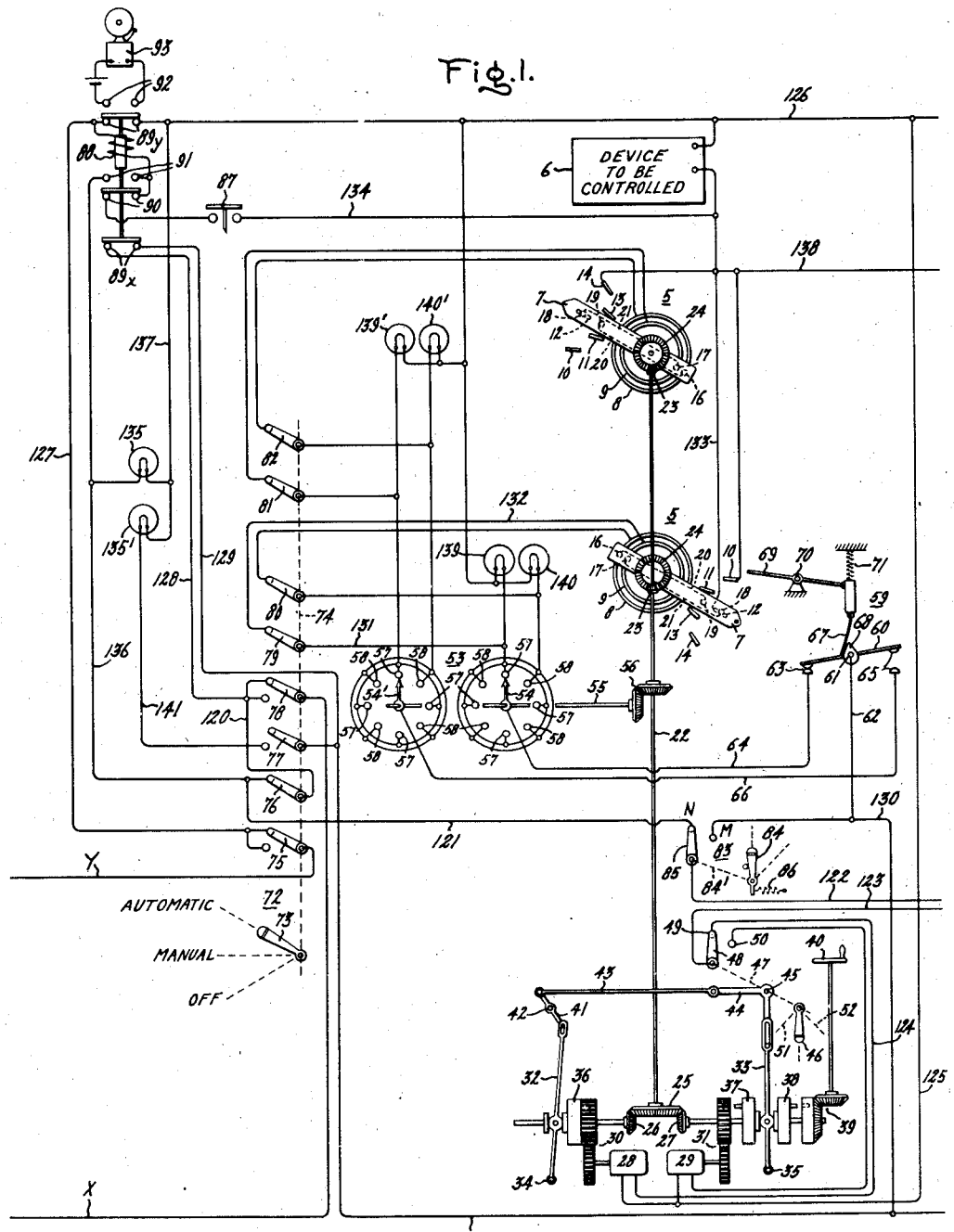

Jan. 15, 1946.  A. H. POWELL  2,393,187
TIMING CONTROL APPARATUS
Filed Feb. 10, 1944   2 Sheets-Sheet 1

Inventor:
Alric H. Powell,
by Harry E. Dunham
His Attorney.

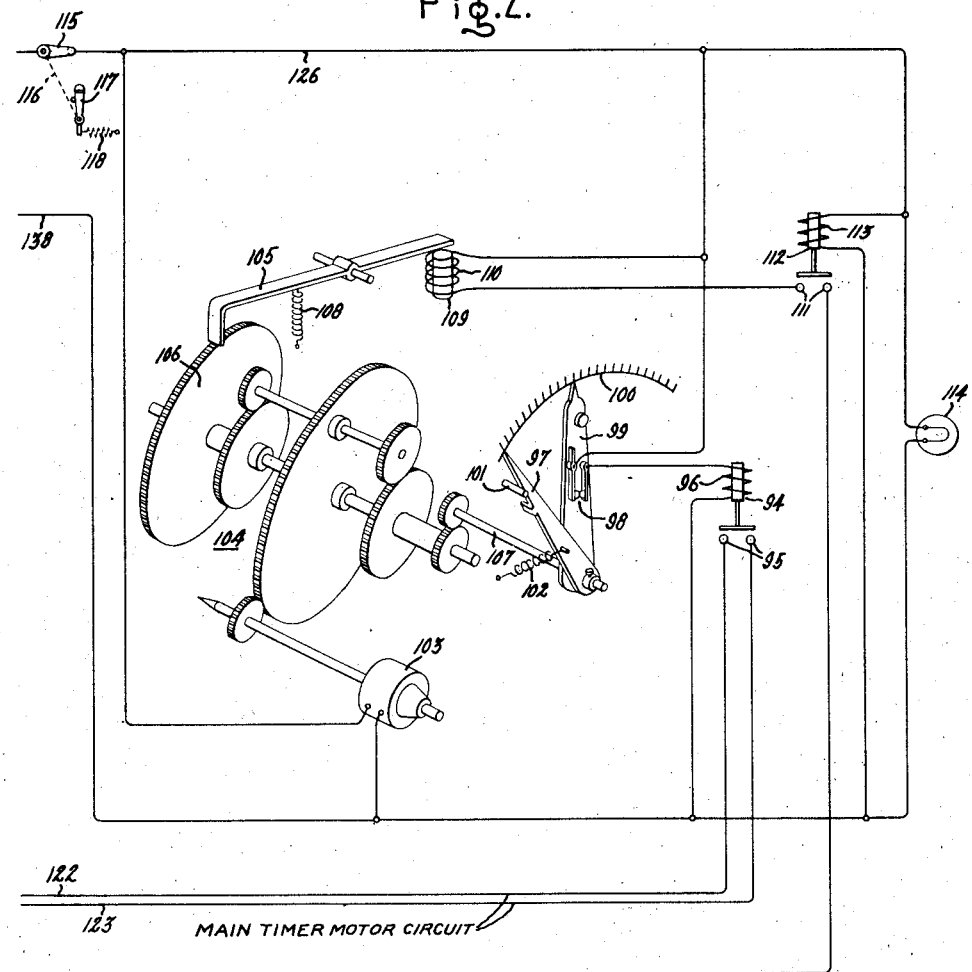

Patented Jan. 15, 1946

2,393,187

UNITED STATES PATENT OFFICE 2,393,187

TIMING CONTROL APPARATUS

Alric H. Powell, Yeadon, Pa., assignor to General Electric Company, a corporation of New York Application February 10, 1944, Serial No. 521,794

5 Claims. (Cl. 161—1)

My invention relates to improvements in timing control apparatus and more particularly electrical control apparatus for automatically timing each of a plurality of operations which have to be performed in a given sequence with a definite time for each operation. Such operational sequences occur in various manufacturing processes, for example, the manufacture of gasoline, synthetic rubber, water gas and other products.

For automatic control, many of these processes involve so many operational steps that a large number of switching stages would be required if the timing apparatus were run continuously. Consequently, many contact points would be sacrificed, especially when one or more of the series of operations required a relatively long time for completion. This would necessitate an undesirable investment in timing equipment together with large space requirements and excessive maintenance. To avoid this, it has been proposed to use one or more supplementary or auxiliary timers which are known to the art as dormant timers. These are so arranged as to stop the timing apparatus for operations requiring a long time and then to restart the timing operation upon completion of the long time operation. In this way, the range of the timing apparatus was materially increased. However, arrangements with which I am familiar require the use of so many switching stages that the timing apparatus is not used to the best advantage.

Where dormant timers have been used, it has been customary to energize them and the necessary controls from the source which energizes the main timing apparatus. If the voltage of this source should fail, even though only momentarily, the dormant timer must not reset on loss of voltage, otherwise there will follow an overtime action in the particular long time operation under its control. Such overtime action might ruin the product or even prove hazardous from the standpoint of possible explosions, fire, and so forth. Of course, if the control voltage is off for any material time, it is necessary to resort to manual control. But generally speaking, the usual loss of voltage is momentary in consequence of switching surges, momentary overloads and the like on the power system.

An object of my invention is to provide improved timing control apparatus wherein the main timing apparatus is arranged to be stopped at a particular control point or switching stage and maintained inoperative for the desired time, at the end of which it is again started from the same control point. Another object of my invention is to provide a dormant timing control which requires the minimum number of switching stages, that is, one. A further object of my invention is to provide an improved timing control apparatus wherein one dormant timer can be used to stop the main timing apparatus for any one or more of a plurality of operations, each requiring substantially the same time with no more main timer switching stages required than the number of operations to be performed. Still another object of my invention is to provide improved electrical timing control apparatus wherein momentary loss of voltage of the control source during a dormant timing stage does not materially alter the duration of such stage. These and other objects of my invention will hereinafter appear in more detail.

In accordance with my invention, I provide, for a main timer having a plurality of control or switching points, a dormant timer control such that the main timer can be stopped at any desired switching point or stage and maintained at such stage for a predetermined time and then restarted to continue its normal timing controls. Also in accordance with my invention, I provide, for an electrically actuated main timer, a non-resetting dormant timer control energized from the same source as the main timer so that momentary loss of voltage of the control source is substantially ineffective to alter the length of the dormant period.

My invention will be better understood from the following description when considered in connection with the accompanying two sheets of drawings, and its scope will be pointed out in the appended claims.

In the accompanying two sheets of drawings, Figs. 1 and 2, when taken together right edge to left edge, respectively, diagrammatically illustrate an electric timing control apparatus embodying my invention with the main timing apparatus shown in Fig. 1 and the dormant timing apparatus shown in Fig. 2.

Referring now to Fig. 1, the main timer comprises one or more selective switches 5 for controlling the operation of a plurality of devices which are to be operated in a predetermined sequence and at intervals which depend upon the character of the steps in the process to be performed. For the purpose of illustrating my invention, only one device 6 is shown and that schematically. The devices may in general be electrically actuated control elements or mechanism arranged to be energized from a suitable source, indicated simply as buses X and Y, for controlling and effecting the operation of motors, valves, pumps, etc., according to the character of the process in question. As shown, each selective switch 5 comprises a movable circuit controlling member 7 which is mounted for rotation about the center of concentrically arranged stationary contacts comprising two spaced ring contacts 8 and 9 and two circular rows of staggered selective contacts 10, 11, 12, 13 and 14. For the purpose of illustrating my invention, only a few of these selective contacts are shown, but it is to be understood that any desired number may be provided. Thus, in one embodiment of my invention, there are about four hundred and fifty selective contacts for each circuit controlling member 7. As shown, the circuit controlling members 7 are not of themselves conductive, but each carries at one end contacts 16 and 17 which engage the ring contacts 8 and 9, respectively, and at the other end contacts 18 and 19 which engage the contacts 10, 11, 12, 13, 14, etc. alternately as the circuit controlling member 7 is turned clockwise. For completing circuits between the ring contacts and the selective contacts, the contacts 16 and 19 are connected by a conductor 20 and the contacts 17 and 18 are connected by a conductor 21, both of the conductors 20 and 21 being mounted on the circuit controlling member 7.

For rotating the circuit controlling members 7 at the desired speed, I provide an electric motor actuated reducing gear mechanism. As shown, this mechanism comprises a vertical shaft 22 to which are secured bevel pinions 23 in step-down engagement with bevel gears 24 rigidly associated with the members 7. At its lower end, the shaft 22 carries a bevel gear 25 in engagement with bevel pinions 26 and 27 which are arranged to be driven selectively by one or the other of two motors 28 and 29 acting through reducing gear mechanisms 30 and 31, respectively. Preferably the motors 28 and 29 are of the relatively slow speed self-starting synchronous inductor type, such as disclosed, for example, in United States Letters Patent 2,105,513, issued on January 18, 1938, since such motors start and stop substantially instantaneously and so provide more accurate timing than is possible with the usual type of motor having a direct connected brake. Also, by using a slow speed motor, the necessary gear reduction is materially reduced and simplified and the rotating parts move at relatively slow speeds.

In order to actuate the shaft 22 in case of failure of a motor or its associated gear mechanism or to drive the shaft 22 at one speed while the lower circuit controlling member 7 is in operation and at a different speed while the upper circuit controlling member 7 is in operation and also to operate manually, I provide clutch means such that the shaft 22 may be actuated selectively by either of the motors 28 and 29 or manually as desired. As shown, this clutch means comprises shifting levers 32 and 33, respectively pivoted at 34 and 35. These levers are simultaneously movable selectively to shift clutch members 36, 37 and 38 which are respectively operable to put the shaft 22 in driving relationship with the motor 28, the motor 29 or a manually operable gear mechanism 39 provided with a handwheel 40. For this selective operation of the shifting levers 32 and 33, they are suitably slotted and interconnected by a straight crank 41 pivoted at 42, a link 43 and a bell crank 44 pivoted at 45. Operation of the bell crank 44 to obtain the desired driving selectivity or clutching action is effected by turning a handle 46 which is secured to a shaft, indicated by the broken line 47 and rigidly associated with the bell crank.

In order simultaneously to control the energization of the motors 28 and 29 and the clutching action, the shaft 47 has rigidly associated therewith and insulated therefrom a switching member 48 which is arranged to cooperate with contacts 49 and 50 respectively to control the energizing circuits of the motors 28 and 29. In the vertical position of the handle 46 illustrated, the gear mechanism 30 associated with the motor 28 is in driving relationship with the shaft 22 through the clutch member 36, and the switching member 48 is in engagement with the contact 49 in the energizing circuit of the motor 28. If the handle 46 is turned clockwise to the position indicated by the broken line 51, then the gear mechanism 31 associated with the motor 29 is in driving relationship with the shaft 22 through the clutch member 37, and the switching member 48 is in engagement with the contact 50 in the energizing circuit of the motor 29. If the handle 46 is turned counterclockwise to the position indicated by the broken line 52, then the manually operable gear mechanism 39 is in driving relationship with the shaft 22 through the clutch member 38, and the switching member 48 does not engage either of the contacts 49 or 50.

The function of the circuit controlling member 7 and the cooperating contacts 10, 11, 12, etc. is primarily selectivity. Accordingly, since the switch structure necessary to provide such selectivity for a large number of circuits is restricted by space requirements and portability of equipment, it is not feasible to have this structure encompass circuit making and interrupting functions. In view of this, I provide suitable means, such as an impulse switch 53, for the purpose of making and interrupting the circuits of devices to be controlled, such as the device 6. As shown, the impulse switch 53 is of a rotary control type, examples of which are well known in the art, and comprises two rotatable switching arms 54 and 54' which, for correct timing, are mounted on and insulated from a shaft 55 driven directly from the shaft 22 through bevel gears 56. The switching arms 54 and 54' are arranged to cooperate respectively with the lower and the upper circuit controlling members 7. For this purpose and in order to obtain maximum length of service, each switching arm 54 and 54' is arranged to cooperate with a plurality of parallel connected stationary contacts 57 and a plurality of stationary contacts 58 so arranged that each switching arm alternately engages a contact 57 and a contact 58. The construction and arrangement of the impulse switch 53 is such that when either of the circuit controlling members 7 is in the middle of a stationary contact segment 10, 11, 12, etc., the cooperating impulse switch contact closes and completes an electrical circuit to the contact segment as will appear in more detail hereinafter.

In order to avoid circuit controlling operations by one circuit controlling member 7 while the other circuit controlling member 7 is going through its active operational sequence, particularly when both circuit controlling members are required to complete a series of operations, I provide suitable means, such as a transfer switch 59, which, as shown, is arranged to be operated by the lower circuit controlling member 7 every time this member makes a complete rotation.

This switch 59, as illustrated, is of the over-center stay-put type and comprises a double-throw contact arm 60 pivotally supported at 61 and arranged to connect an incoming conductor 62 to the impulse switching arm 54 through contacts 63 and a conductor 64 to the switching arm 54' through contacts 65 and a conductor 66. The double-throw contact 60 is actuated by a movable yielding member 67 which rides on one side or the other of a suitably shaped cam 68 to tip the arm 61 as the lower circuit controlling member 7 rotates clockwise into engagement with an operating lever 69 pivoted at 70 and arranged to raise the member 67 against the bias of a spring 71. As soon as the lower circuit controlling member 7 moves by the end of the arm 69, the spring 71 forces the member 67 downward to actuate the switch arm 60 to its other throw position.

For general control of the timing mechanism so that it may be operated automatically, manually or stopped entirely, I provide a control power and transfer switch 72 which may be of a rotary type, examples of which are well known to the art. As shown, this switch has an operating handle 73 operative to three positions, respectively marked Automatic, Manual and Off. The handle 73 is rigidly secured to a shaft indicated by the broken line 74 and provided with a plurality of switching stages comprising contact arms 75 to 82, inclusive, of which 75 and 78 are double-throw. The connection and arrangement of the several switching stages are such that, when the handle 73 is in the automatic position, the timer will be operated automatically by one of the motors 28, 29 to run through its selective sequence of switching operations in the times desired. If the handle 73 is in the manual position, then the timer may be operated manually by suitable operation of the clutch and switch operating handle 46. If it is desired to stop the timer entirely, then the switch operating handle 73 is moved to the off position. Since it may on occasion be desirable to use the driving motor to move one or more of the circuit controlling members 7 to a desired position without device operation before coming to such position, I may provide a further control switching means 83 which, as shown, is of the rotary type, examples of which are well known to the art. This switch comprises an operating handle 84 rigidly secured to and insulated from a shaft indicated by the broken line 84'. To this shaft is rigidly secured a contact arm 85 movable to two positions or contacts, which may be designated N, normal, and M, momentary. The handle 84 and associated parts are biased to the normal position against a stop by suitable means indicated as a spring 86. The connection and arrangement of the switch arm 85 and the contacts N and M are such that, in the normal position, the timer may be operated either automatically or manually, but in the momentary position M, where the handle 84 must be held, the circuit controlling members 7 can be move to a desired position by one or the other of the motors 28, 29 when the handle 73 of the control and transfer switch 72 is in the manual position.

In order to provide an alarm and also to prevent operation of any device to be controlled, such as 6, in the event of failure of the immediately preceding device to function correctly, each device is provided with suitable switching means 87, such for example as a limit switch. This switch 87 is so arranged that, on failure of the prior device to operate correctly, it remains closed to effect the energization of a control and alarm relay 88 at the instant the circuit of the device 6 is completed. This relay, through its circuit opening contacts 89x and 89y, disconnects the device and the motors 28 and 29 from the buses X and Y, respectively, opens its energizing circuit at its circuit opening contacts 90, seals itself in through its circuit closing contacts 91, and through its circuit closing contacts 92 completes the energizing circuit of an alarm, such as a bell 93.

In accordance with my invention, I provide means for stopping any one or more of the circuit controlling members 7 on any desired associated contact segment or switch point and for maintaining such stoppage for the time required to complete the operation under the control of the device which is energized when the circuit controlling member reaches the contact segment in question. As illustrated in Fig. 2, this means for stopping a circuit controlling member 7 in a predetermined position and maintaining it there a given time comprises switching means, such as a relay 94, which is connected to be operated from an initial position to a final position, when the circuit controlling member 7 reaches the predetermined circuit controlling position, to effect the deenergization of the circuit of the motor 28 or 29 in service at the time. For this purpose, the relay 94 is provided with circuit opening contacts 95 in series with the energizing circuits of the motors 28 and 29. These circuits include a common portion identified on Fig. 2 as the main timer motor circuit. Further in accordance with my invention, the relay 94 has its energizing winding 96 so connected as to be energized when the circuit controlling member 7 reaches the predetermined position as, for example, when the lower circuit controlling member engages the stationary contact segment 12.

Also in accordance with my invention, I provide means for preventing the energization of the timer motor circuit for the desired predetermined time. As shown, this means comprises a movable element, such as a circuit controller 97, which is movable through a given range in the desired predetermined time to effect at the end of said time the deenergization of the relay 94 so as to cause the closing of the contacts in the main timer motor circuit. For this purpose, the circuit controller 97 is arranged to open contacts 98 connected in series in the circuit of the relay winding 96. As shown, these contacts 98 are mounted on an adjustably positioned arm 99 which is movable relatively to a suitably graduated scale 100 for setting the desired time delay.

For actuating the element 97 from its initial position determined by a stop 101 to which the element is biased by suitable means, such as a spring 102, suitable actuating or electromotive means, such as a motor 103, is arranged to be energized when the circuit controlling member 7 reaches the desired controlling position. For moving the element 97 at a desired slow speed, there is provided suitable driving means, such as a differential gear train 104, which is arranged to be placed in driving relationship with the element 97 while the circuit controlling member 7 is in the predetermined controlling position. For establishing such driving relationship, there is provided an actuating connection, which as shown comprises a pivotally mounted clutch member 105 for holding a gear 106 of the differential train 104 against movement so as to effect rotation of the shaft 107 on which the element 97 is rigidly mounted. This clutch or holding member 105 is biased to the holding position by suitable means, such as a spring 108, but is arranged to be moved from and held out of engagement with the gear 106 to interrupt the actuating connection by suitable means, such as a clutch releasing magnet 109, the winding 110 of which is arranged to be energized from the buses X and Y. For controlling the energization of the clutch magnet 109, the circuit of its winding is arranged to include the circuit opening contacts 111 of a control relay 112 whose winding 113 is connected to be energized when the movable circuit controlling member 7 in question reaches the desired circuit controlling position for which a given sustained or dormant timing period is desired. For an indication of the condition of energization of the control relay 112 and also the integrity of the circuits of the dormant timer, there may be provided indicating means, such as a lamp 114, which is connected to be energized as long as the movable circuit controlling member 7 is in the desired circuit controlling position. For momentarily controlling the energization of the dormant timer, there may be included in circuit with the parts thereof a switch 115 mounted on and insulated from a shaft indicated by the broken line 116 and arranged to be operated by a handle 117 which is biased to the switch closing position by a spring 118.

For an explanation of the operation of the illustrated embodiment of my invention, it will be assumed that the parts are positioned as shown in the drawings, that is, with the control power and transfer switch 72 in the automatic position and the clutch and motor selector handle 46 in position to close its contacts 48 and 49 in the circuit of the motor 28 and to clutch the gear mechanism 30 associated with the motor 28 so as to drive the bevel gears 26 and 25 and thereby rotate the shaft 22. It will further be assumed that the lower circuit controlling member 7 has been actuated to engage the stationary contact segment 12 in the circuit of the control device 6. Then, before this engagement of the lower circuit controlling member 7 with its associated contact segment 12, the energizing circuit of the motor 28 was completed from bus X through switch arm 78, conductor 120, switch arm 76, conductor 121, switch arm 85, conductor 122, contacts 95 of relay 94, conductor 123, switch arm 48, conductor 124, motor 28, conductors 125 and 126, contacts 89y of relay 88, conductor 127 and switch arm 75 to bus Y.

When the lower circuit controlling member 7 engages the contact segment 12 and the impulse switch arm 54 engages the contact 57, as shown, the circuit of the control device 6 is completed as follows: from bus X through switch arm 78, conductor 128, contacts 89x of relay 88, conductors 129, 130 and 62, transfer switch arm 60, contacts 63, conductor 64, switch arm 54, contact 57, conductor 131, switch arm 79, conductor 132, lower inner ring contact 9, contact 17, conductor 21, contact 18, contact segment 12, conductor 133, device 6, conductor 126, contacts 89y of relay 88, conductor 127, and switch arm 75 to bus Y. If the prior control device has failed to function correctly, its contacts 87 will be closed. Accordingly, the relay 88 will be connected across the buses X and Y substantially simultaneously with the device 6 through a parallel circuit from conductor 133 and including conductor 134 through switch 87 and the contacts 90 of the relay 88. In the event that the relay 88 is energized, it will interrupt the circuit of the control device 6 at contacts 89x and 89y. If, however, the buses X and Y are energized and the relay 88 is deenergized, that is, switching device 87 is open, then to indicate automatic control an indicator lamp 135 connected in a circuit from bus X through switch arm 78, conductor 120, switch arm 76, conductor 136, lamp 135, conductor 137, contacts 89y of relay 88, conductor 127, and switch arm 75 to bus Y will be lighted.

Assuming now that the device 6 is one whose delayed or dormant period is to be controlled by the dormant timer arrangement shown in Fig. 2, then, upon completion of the circuit of the device 6 as heretofore traced, the dormant timer will be started in operation since the motor 103, the clutch control relay 112, the motor stopping relay 94, and the indicating lamp 114 will be simultaneously connected in parallel with the device 6 across conductors 138 and 126. Immediately upon the opening of the contacts 95 of the motor control relay 94, the motor 28 stops with the contacts 18 of the circuit controlling member 7 still on the contact segment 12. Upon the opening of the contacts 111 of the clutch control relay 112, the clutch coil 110 is deenergized so that an actuating connection is established between the motor 103 and the controller 97 when the clutch member 105 engages the gear 106. The controller 97 is thus started into operation and, after a predetermined time, opens the contacts 98 in the circuit of the motor control relay 94, which closes its contacts 95 to again start the motor 28.

As soon as the impulse switch moves its arm 54 from the contact 57, the motor 103 and the clutch control relay 112 and the indicating lamp 114 are deenergized. Upon deenergization, the clutch control relay 112 closes its contacts 111 to interrupt the actuating connection between the controller 97 and the motor 103. Consequently the dormant timer controller 97 resets under the bias of the spring 102. It is to be noted that this resetting action does not require the use of any additional timer contacts. The timing action of the main timer shown in Fig. 1 continues in accordance with a predetermined schedule to control other devices, not shown, in the same manner as the device 6 is controlled and either with or without the supplementary action of a dormant timer.

In case of loss of voltage at the buses X and Y, the clutch control relay 112 will drop out to close its contacts 111, but the clutch magnet 109, of course, continues deenergized because of no voltage. Also, motor 103 is deenergized as well as the motor control relay 96. Inasmuch as the clutch control magnet 109 is deenergized, the actuating connection between the deenergized motor 103 and the controller 97 is maintained so that the controller is not returned to its initial or starting position but remains just where it was when voltage failed. Upon restoration of voltage, the clutch control relay 112 quickly opens its contacts 111 to prevent release of the clutch member 105, and the motor 103 is reenergized to continue the timing action of the dormant timer from its intermediate position. Consequently, for momentary losses in voltage, the dormant timer period is not materially changed because there is no reset of the controller 97. Of course, with the return of voltage, the motor control relay 94 is immediately reenergized to deenergize the main timer motor circuit and thereby prevent rotation of the circuit controlling member 7.

If there is more than one step in the process requiring the same delayed or dormant period, it will be apparent that a single dormant timer may be used for all of these steps. Thus, for example, other contact segments, such as 10 in the lower group and 14 in the upper group, may be connected to the conductor 138, as shown, so as to start the dormant timer when the upper and lower circuit controlling members 7 respectively engage the upper contact segment 14 and the lower contact segment 10. It will be apparent that, in accordance with my invention, other dormant timers may be used to take care of different delayed periods and that such other timers can be connected, in a manner similar to the one shown, to correspond with the devices whose times are to be controlled by a shutdown of the main timer.

For manual operation, the operating handle 73 of the control and transfer switch 72 is moved to the intermediate or manual position and the motor and clutch control handle 46 to the manual position 52. With these changes in mind and the circuits and operation heretofore described, the operation under manual control including the operation of the dormant timer will be apparent except, of course, that under manual control the dormant timer will not automatically restart the main timer at the end of the delayed period.

For indicating the completion of the device control circuits from the bus X through the impulse switch, there are provided indicating lamps 139 and 140 respectively for the outer and inner rows of segmental contacts associated with the lower circuit controlling member 7 and similar indicating lamps 139' and 140' respectively associated with the outer and inner rows of segmental contacts associated with the upper circuit controlling member 7. The circuits of these lamps from the bus X to the contacts 57 and 58 are the same as the device circuits to these contacts. The rest of the circuits of these lamps 139, 140, 139' and 140' from the contacts 57 and 58 to the conductor 126 and thence to the bus Y will be obvious by inspection. Also, an indicating lamp 135', corresponding to lamp 135 and similarly energized, may be provided for the manual position of the control power and transfer switch 72. In this case, the circuit of the lamp 135' is from the bus X through the switch arm 78 in its lower position, conductor 128, contacts 89x of the relay 88, conductor 129, switch arm 77 in its lower position, conductor 141, lamp 135', conductor 137, contacts 89y of the relay 88, conductor 127, and switch arm 75 in its lower position to bus Y.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In combination, a timing device comprising a circuit controlling member movable through a plurality of circuit controlling positions, a motor for effecting the movement of said member, an energizing circuit for said motor, and means for stopping said member in one of said positions and maintaining it there for a predetermined time comprising an electromagnetic switching means connected to be energized when said member reaches said one position and arranged when energized to effect the deenergization of said motor energizing circuit, a movable element for effecting the deenergization of said switching means a predetermined time after said member reaches said one position and while still in said one position, electromotive means connected to be energized while said member is in said one position, means for establishing an actuating connection between said electromotive means and said element while said member is in said one position, and means for interrupting said actuating connection upon movement of said member from said one position.

2. In combination, a timing device comprising a circuit controlling member movable through a plurality of circuit controlling positions, a motor for effecting the movement of said member, a source of electromotive force, a circuit for energizing said motor from said source, means for stopping said member in one of said positions and maintaining it there for a predetermined time comprising an electromagnetic switching means connected to be energized from said source when said member reaches said one position and arranged when energized to effect the deenergization of said motor energizing circuit, means for deenergizing said switching means a predetermined time after said member reaches said one position and while still in said one position comprising a movable element for effecting the opening of the circuit of the winding of said switching means, electromotive means connected to be energized from said source while said member is in said one position, means tending to establish an actuating connection between said electromotive means and said element, and electromagnetic means connected to be energized from said source and arranged to be controlled by said member to prevent the establishment of said actuating connection except when the member is in said one position.

3. In combination, a timing device comprising a circuit controlling member movable through a plurality of circuit controlling positions, motive means for effecting the movement of said member, means for energizing said motive means, means controlled by said member when the member reaches a predetermined one of said positions and arranged to effect the deenergization of said motive means to stop the member in said one position, and timing means responsive to said member reaching said one position for preventing movement of the member by said motive means from said one position for a predetermined time comprising an element movable in one direction through a given range in said predetermined time and operative at the end of said range to effect the reenergization of said motive means and means for quickly moving said element in the opposite direction through said predetermined range following reenergization of said motive means.

4. In combination, a timing device comprising a circuit controlling member movable through a plurality of circuit controlling positions, motive means for effecting the movement of said member, switching means connected to be operated from an initial circuit controlling condition to a final circuit controlling condition when said member reaches a predetermined one of said positions and arranged to effect the deenergization of said motive means to stop the member in said one position, and means operative while said member is in said one position to prevent movement of the member by said motive means from said one position for predetermined time comprising a circuit controlling member movable in one direction through a predetermined range in said predetermined time and operative at the end of said range to restore said switching means to its initial circuit controlling condition whereby to effect the reenergization of said motive means, and means for quickly moving said controller reversely through said predetermined range upon reenergization of said motive means.

5. In combination, a timing device comprising a circuit controlling member movable through a plurality of circuit controlling positions, electromotive means for effecting the movement of said member, a source of electromotive force, means for energizing said electromotive means from said source, electromagnetic switching means connected to be energized from said source when said member reaches a predetermined one of said positions and arranged when energized to effect the deenergization of said electromotive means to stop the member in said one position, and means connected to be energized from said source while said member is in said one position operative to prevent movement of the member by said electromotive means from said one position for a predetermined time comprising a circuit controller movable in one direction through a predetermined range in said predetermined time and operative at the end of said range to effect the deenergization of said switching means whereby to effect the reenergization of said electromotive means, means for quickly moving said controller reversely through said predetermined range upon reenergization of said electromotive means, and means for preventing the reverse movement of said controller upon failure of the voltage of said source while the controller is in an intermediate position.

ALRIC H. POWELL.